LOGICAL SYSTEM FOR A HIGH SPEED PRINTER

Filed May 27, 1960

*INVENTOR.*
CARL I. WASSERMAN
*BY* Alfred W. Barber
ATTORNEY 3,024,723
Patented Mar. 13, 1962

3,024,723

LOGICAL SYSTEM FOR A HIGH SPEED PRINTER

Carl I. Wasserman, Queens Village, N.Y., assignor to Potter Instrument Co., Inc., Plainview, N.Y., a corporation of New York Filed May 27, 1960, Ser. No. 32,333
7 Claims. (Cl. 101—93)

Figure 1:
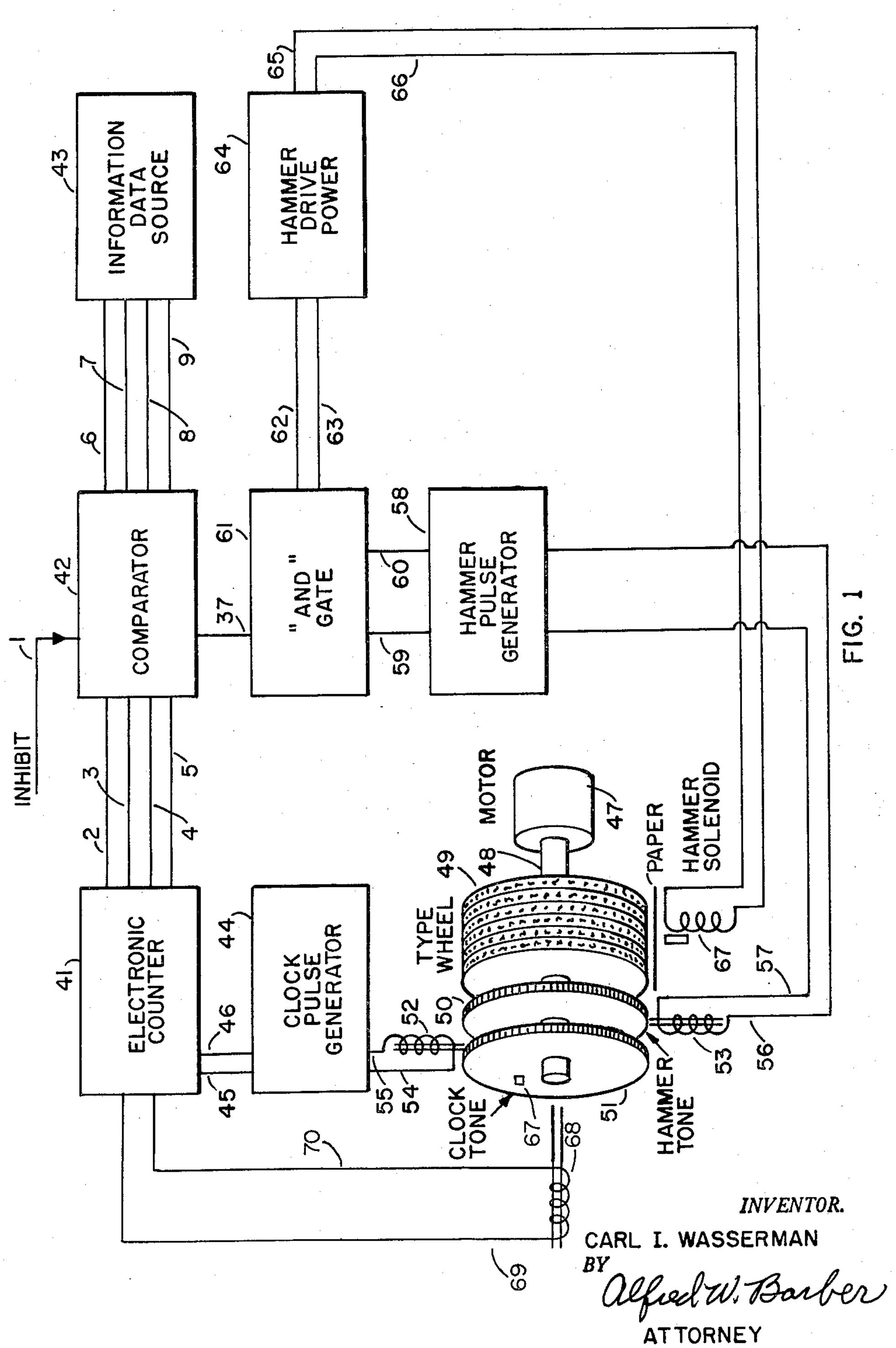

The present invention concerns high speed printing systems and, in particular, methods of and means for operating printing hammers in accordance with coded information.

In the electronic computer and allied fields it is often necessary to print out information at extremely high rates. This information is usually in coded form. For example, each character is represented by a number representing the character according to a predetermined code. Since the code may be readily translated into a binary number, it is a simple matter to represent a code defined character by its corresponding binary number. This representation of a coded character by a binary number leads to a simple and direct way of utilizing coded characters to operate high speed printers.

The high speed printer of the present invention utilizes a type wheel carrying lines of type. Axially, a line of type is a repetition of the same character while peripherally each line position carries a different character. If the character code used is a four level code, 0000 will represent a certain character which may also be expressed by binary number 0000. Similarly, the character represented by code 0010 becomes binary 0010, coded character 0101 becomes binary 0101, and so on. If the type wheel is rotated and is provided with a row of printing hammers along a predetermined line, the first or 0000 code and binary 0000 will apply to the first line position of the type wheel with respect to the line of the type hammers. If the wheel is rotated one line position and a binary counter is used to count the successive type line positions the first line position from 0000 will be 1000. In this line on the type wheel is placed a row of the character coded 1000. In the same way the next type line will contain characters represented by binary 0100 and so on. In order to generate a coded signal which represents the type in each line it is merely necessary to count the type line positions successively with a binary counter having a parallel output, directly providing a 1—2—4—8 or similar code. This may be done with a clock tone wheel attached to the shaft of the type wheel having one tooth or pulse generating element for each line of type on the wheel. The counting of the pulses of the clock tone in a binary counter will then automatically generate signals coded according to the character code of the type wheel characters. The only additional information required is a reset signal which is derived from a single tooth or slot in the clock wheel corresponding to zero position of the type wheel which may be used to generate a signal for resetting the binary counter to zero.

In order to complete the high speed printing device a comparison circuit is utilized which may be of the form shown in the application for United States Letters Patent entitled "Electronic Code Comparator" filed on February 3, 1960, and bearing Serial No. 6,450 for comparing incoming coded character information with the output of the binary counter. When a match is found, a pulse is applied to an "and" gate. In order to complete the printing, a hammer tone generator is also carried by the shaft of the type wheel for generating a pulse at the instant each type line is in printing position. This pulse is also applied to the "and" gate to complete the print instruction. An output from the "and" gate which is derived from coincidence of an output from the comparator and the hammer tone generator initiates a power pulse which drives the hammer solenoid and a character is printed. It will be apparent that if no line of type is to be utilized in a given line position, that it is merely necessary to omit the hammer tone impulse for that line and the system will function properly on all remaining line positions. Thus a system of great flexibility and extreme simplicity has been devised.

Accordingly, one object of the present invention is to provide a method of and means for printing out coded information requiring a minimum of apparatus.

Another object is to provide a high speed printing device in which provision may be made for printing coded information and in which simple changes provide for a change code.

Still another object is to provide a high speed printing device which automatically translates coded information for printing in terms of a simple binary number.

These and other objects will be apparent to those skilled in the art from the detailed description of the invention given in connection with the figure of the drawing.

In the drawing is shown a block diagram representing the preferred form of the present invention.

The FIGURE of the drawing shows a comparator 42 receiving information from information data source 43 over lines 6, 7, 8 and 9 and from electronic counter 41 over lines 2, 3, 4 and 5 and an inhibit signal when required over line 1. Comparator 42 may be any suitable electronic comparator capable of producing an output pulse when a match is detected line for line between the inputs from information data source 43 and electronic counter 41 such as the Electronic Code Comparator disclosed in the application for Letters Patent filed February 3, 1960, and bearing Serial No. 6,450. The electronic counter 41 may be any suitable electronic counter capable of yielding so called 1—2—4—8 output signals on the four lines 2, 3, 4 and 5. This is generally possible in an electronic counter utilizing binary flip-flop counting stages which are well known in the art. Information from information data source 43 should be in coded form and for the case shown in four level code over lines 6, 7, 8 and 9. It will be evident that practically any code may be utilized as for example, a six level code in which case six lines each would be required from the electronic counter 41 and the information data source 43 to the comparator 42 which in turn would have to be capable of providing an output pulse when a match existed simultaneously on all six lines.

Turning to the mechanical portion of the present device, a plurality of type wheels 49 are mounted on a shaft 48 and rotated by motor 47. Also mounted on shaft 48 are two tone wheels 50 and 51. Tone wheel 51 may be called a clock tone wheel and carries a predetermined number of teeth around its periphery. A magnetic pick-up device 52 mounted adjacent to wheel 51 generates an impulse each time a tooth passes and this impulse is applied to the clock pulse generator 44 over leads 54 and 55. Clock pulse generator 44 may be any suitable shaping amplifier or equivalent device generating a shaped and readily counted pulse for each pulse received from pick-up 52 which is applied to counter 41 over leads 45 and 46. Type wheels 49 are provided with a large number of rows of type slots or positions around its periphery and clock tone wheel 51 is provided with one tooth for each type slot. The hammer tone wheel 50 may have a tooth for each actual row of type and impulses generated by its associated pick-up 53 and applied to hammer pulse generator 58 over leads 56 and 57 are equal to the number of actual rows of type. Thus if for some reason all of the type slots are not filled, hammer tone pulses are generated only for the filled slots. Hammer tone generator 58 may be any suitable pulse generator for generating a shape pulse in a predetermined time relationship to the teeth on tone wheel 50. The pulses generated by hammer pulse generator 58 are thus timed so that if a hammer solenoid 67 is fired at the same instant a predetermined character of type wheel 49 will be printed on the paper. The pulses from generator 58 are applied to "AND" gate 61 over leads 59 and 60. Thus if there is a coincidence between a pulse from comparator 42 and a pulse from generator 58, an output pulse is generated and applied over leads 62 and 63 to hammer drive power source 64 for generating a hammer drive pulse. This hammer drive pulse is applied over leads 65 and 66 to actuate hammer solenoid 67. It will be understood that a hammer, hammer solenoid and associated circuitry for its operation, although not shown, is provided for each ring of type on type wheel 49.

In order to provide for continuous operation of the printing system shown, the electronic counter 41 is reset for each revolution of the type wheels 49. This resetting is accomplished by providing a single magnetic stud 67 and a pick-up 68 which will generate a pulse once per revolution. This pulse is applied to reset counter 41 over leads 69 and 70.

Now to run over, the performance of this printing system, as type wheel 49 rotates, clock pulses are generated by clock tone wheel 51 and its associated pick-up 52 which are shaped in clock pulse generator 44 and counted by electronic counter 41. The total count at any time in counter 41 appears as a four level code on leads 2, 3, 4 and 5. Information from a data source 43 in four level code form is fed over leads 6, 7, 8 and 9. These two sets of signals are compared in comparator 42 and when a match is found on output pulse is generated and fed out over lead 37. If for any reason it is desired to block this output pulse from appearing at a given time, a pulse may be applied over inhibit line 1. Since the type positions on type wheels 49 are arranged in accordance with the code from the data source, a match in the comparator 42 indicates that a match exists between the data source signal and the corresponding character on the type wheel 49. In order to complete the process of printing, an impulse from hammer tone wheel 50 is fed through pulse generator 58 to and gate 61. The coincidence between the pulses from comparator 42 and pulse generator 58 provides an output to the hammer drive circuit 64 and the hammer solenoid 67 is energized causing the hammer to strike and a character to be printed. The positioning of the teeth on the hammer tone wheel 50 with respect to the position of characters on the type wheel 49 and allowing for delays in the electronic circuits is such that the printing hammer is actuated at the correct instant to print the desired character on the paper.

If a different code is to be utilized in the data source, it is merely necessary to provide a type wheel with changed character positions and corresponding with the new code. If a row of type is omitted or missing, it is merely necessary to omit the corresponding hammer tone wheel tooth.

The drawing shows and there has been described a system utilizing magnetic teeth in the clock and hammer tone wheels. It will be apparent to those skilled in the art that other types of wheels and pick-ups may be employed without departing from the spirit of the invention. For example, these wheels may be discs with boles and the pick-ups may be photo-electric cells.

It will be seen that the present invention provides a very simple method of and means for printing from coded information since no decoding devices are required.

While only a single form of the present invention has been shown and described, many modifications will be apparent to those skilled in the art and within the spirit and scope of the invention as set forth, in particular, in the appended claims.

What is claimed is:

1. In a data printing system, the combination of, a type drum carrying a plurality of rows of type, means for rotating said type wheel at substantially constant speed, a tone generator coupled to said type wheel for generating an impulse for each of said rows of type, a binary counting parallel output counter for counting said impulses, a comparator for comparing level by level the parallel output of said counter with multiple level signals presented in accordance with a predetermined code for providing an output pulse in response to a match between said parallel output and said multiple level signals, a printing hammer positioned with respect to said drum to print on paper passed between said drum and said hammer in response to a hammer drive power pulse, and means generating said power pulse in response to said output pulse.

2. In a data printing system, the combination of, a type drum carrying rows of type arranged circumferentially in accordance with a predetermined code, means for rotating said drum at substantially constant speed, a tone wheel coupled to said drum for inducing an impulse in a pick-up device for each pulser of said wheel, a parallel output binary counter for counting said impulses, a comparator for comparing the parallel output of said counter with multiple level signals presented in accordance with said code to provide a signal in response to a match between said counter output and said multiple level signals, and means for actuating printing means associated with said drum in response to said comparator provided signal.

3. In a data printing system, the combination of, a type drum provided with a plurality of rows of digits arranged sequentially around the periphery of said drum in accordance with a predetermined code, a row of solenoid operated printing hammers for printing from said digits on a paper tape, means for rotating said drum at substantially constant speed, a clock tone wheel coupled to said drum to rotate therewith, a hammer tone wheel coupled to said drum to rotate therewith, a pick-up for generating pulses from said clock tone wheel, a parallel output counter for counting said pulses to provide in said output coded signals representing digits of said type drum at the printing point, a comparator for comparing said output with coded signals to be printed to provide a pulse in responsive to a level by level match between said output and said coded signals, a pick-up for generating pulses from said hammer tone wheel, and printing hammer solenoid energizing means responsive to coincidence between said output pulse and a pulse from said hammer tone wheel pick-up.

4. In a data printing system, the combination of, a type drum provided with a plurality of rows of printing characters arranged selectively around the periphery of said drum in accordance with a predetermined code, a plurality of printing hammers for printing from said characters on a printing medium, means for rotating said drum at substantially constant speed, a clock tone wheel coupled to said drum to rotate therewith, a hammer tone wheel coupled to said drum to rotate therewith, a pick-up for generating pulses from said clock tone wheel, an output counter for counting said pulses to provide code signals in said output representing characters of said type drum at the printing point, a comparator for comparing said output with coded signals to be printed to provide a pulse in response to a match between said output and said coded signals, a pick-up for generating pulses from said hammer tone wheel, and means to activate said printing hammers selectively in response to coincidence between said output pulse and a pulse from said hammer tone wheel pick-up.

5. In a data printing system, the combination of, a type drum provided with a plurality of rows of printing characters arranged in a predetermined pattern around the periphery of said drum in accordance with a predetermined code, a row of printing hammers for printing from said characters on a printing medium, means for rotating said drum at substantially constant speed, a clock tone wheel coupled to said drum to rotate therewith, a hammer tone wheel coupled to said drum to rotate therewith, a magnetic coupling element for generating pulses from said clock tone wheel, an output counter for counting said pulse to provided coded signals in said output representing characters of said type drum at a printing point, a comparator for comparing said output with coded signals to be printed to provide a pulse in response to a match between said output and said coded signals, a magnetic coupling element for generating pulses from said hammer tone wheel, and means to activate said printing hammers selectively in response to coincidence between said output pulse and a pulse from said hammer tone wheel magnetic coupling element.

6. In a data printing system, the combination of, a type drum provided with a plurality of printing characters arranged in a predetermined pattern around the periphery of said drum, a plurality of solenoid-operated printing hammers for printing from said printing characters on a printing medium, means for rotating said drum at substantially constant speed, a clock tone wheel coupled to said drum to rotate therewith, a hammer tone wheel coupled to said drum to rotate therewith, a magnetic pick-up element for generating pulse from said clock tone wheel, an output counter for counting said pulses to provide signals in said output representing characters of said type drum at the printing point, a comparator for comparing said output with coded signals to be printed to provide a pulse in response to a match between said output and said coded signals, a magnetic pick-up element for generating pulses from said hammer tone wheel, and printing hammer solenoid energizing means responsive to coincidence between said output pulse and a pulse from said hammer tone wheel magnetic pick-up element.

7. In a data printing system, the combination of, a type drum provided with a plurality of printing characters arranged in a predetermined pattern around the periphery of said drum in accordance with a predetermined code, a plurality of printing hammers for printing from said printing characters on a printing medium, means for rotating said drum at substantially constant speed, first means coupled to said drum to rotate therewith for generating pulses at a predetermined clock rate, an output counter for counting said pulses to provide coded signals in said output representing printing characters on said type drum at a printing point, means for comparing said output with coded signals to be printed to provide a pulse in response to a match between said output and said coded signals, second means coupled to said drum to rotate therewith for generating pulses in accordance with a printing hammer position, and means responsive to coincidence between said output pulse and a pulse representing said hammer printing position to activate a predetermined printing hammer.

References Cited in the file of this patent

UNITED STATES PATENTS

| | | |
|---|---|---|
| 2,692,551 | Potter | Oct. 26, 1954 |
| 2,757,605 | Dumey | Aug. 7, 1956 |
| 2,776,618 | Hartley | Jan. 8, 1957 |
| 2,915,967 | Gehring | Dec. 8, 1959 |
| 2,940,385 | House | June 14, 1960 |